No. 661,741. Patented Nov. 13, 1900.
G. A. LAMBERT.
VEHICLE POLE.
(Application filed Mar. 28, 1900.)
(No Model.)
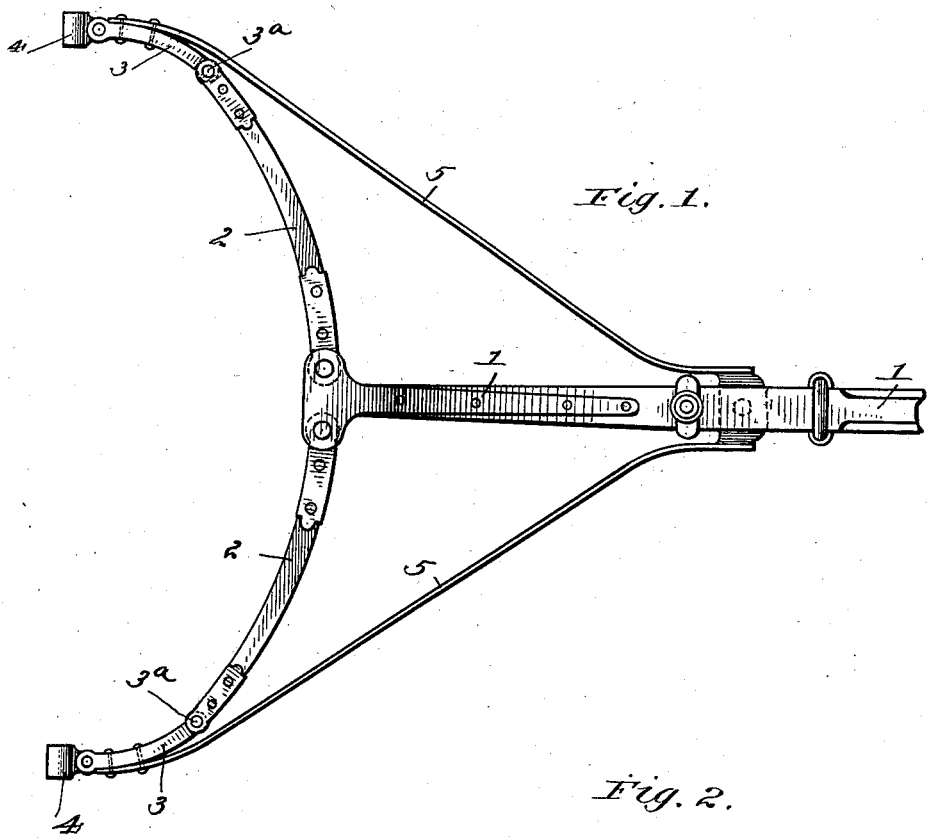
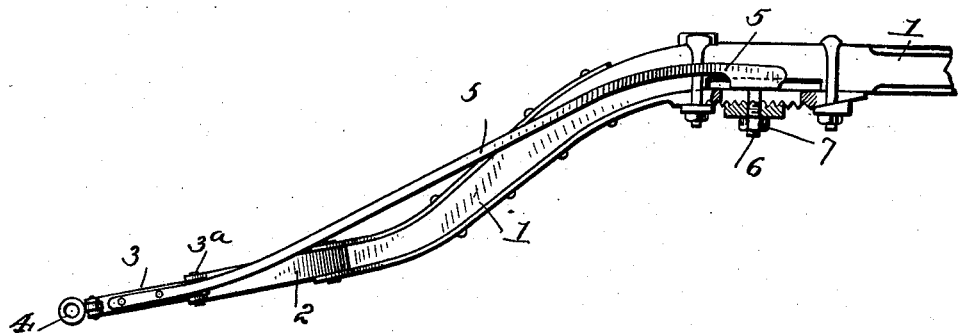
Witnesses
W. H. Babcock
George M. Richards
Inventor
George A. Lambert,
By Davis & Davis,
Attorneys.
THE NORRIS PETERS CO., PHOTO-LITHO., WASHINGTON, D. C.

UNITED STATES PATENT OFFICE.

GEORGE A. LAMBERT, OF ANDERSON, INDIANA, ASSIGNOR TO THE BUCKEYE MANUFACTURING COMPANY, OF SAME PLACE.

VEHICLE-POLE.

SPECIFICATION forming part of Letters Patent No. 661,741, dated November 13, 1900.

Application filed March 28, 1900. Serial No. 10,517. (No model.)

*To all whom it may concern:*

Be it known that I, GEORGE A. LAMBERT, a citizen of the United States, residing at Anderson, in the county of Madison and State of Indiana, have invented certain new and useful Improvements in Vehicle-Poles, of which the following is a specification, reference being had therein to the accompanying drawings, in which—

Figure 1 is a plan view of the rear portion of the pole; and Fig. 2 is a side elevation thereof, partially in section.

The object of the invention is to provide a carriage-pole with a sectional circle-bar which may be readily adjusted to thills which are various distances apart and to so construct and brace the circle-bar that it will be very stiff and rigid, the brace-rods being so secured thereto that they will take all the strain put on the thill-eyes, and thereby relieve all the pivotal connections of the circle-bar.

Referring to the various parts by numerals, 1 designates the pole, and 2 the two-part circle-bar, which is formed in two sections pivotally connected at their inner ends to the rear end of the pole. To the outer free ends of these circle-bar sections are pivoted at 3ª the rearward and outward curved extension-arms 3. To the rear ends of these extension-arms are pivoted the thill-eyes 4. To the outer sides of these extension-arms are rigidly bolted or riveted or otherwise suitably secured the rear ends of the brace-rods 5, whose forward ends are connected together and are adjustably connected to the pole by means of the clamp-nut 7 and bolt 6.

When it is desired to adjust the thill-eyes to the thill-irons on the vehicle-axle, the clamp-nut is loosened to free the forward ends of the braces, and then the thill-eyes are moved outward or inward, as desired, to fit the thill-irons, and then the clamp-nut is again tightened. By pivoting the arms 3 on the outer ends of the two-part circle-bar sections the brace-rods may be rigidly bolted at their rear ends to the outer sides of the said arms 3 without interfering with the adjustability of the circle-bar, the pivotal joints between the circle-bar sections and the arms 3 permitting the said arms and the circle-bar sections to be swung outward without buckling the brace-rods. If the brace-rods were connected directly to the two sections of the circle-bar, they would have to be pivoted thereto in order to permit said sections of the circle-bars to swing on their pivots without buckling the said rods. These pivotal pins between the brace-rods and the circle-bar sections would be objectionable, as the strain would be brought directly on said joints. One great disadvantage of such a structure is that the pivotal joints will soon wear under the strains brought on them and become loose and rattle. By connecting the brace-rods at their rear ends rigidly to the extension-arms and clamping them to the pole at their forward ends all strain put on the thill-eyes will be transferred directly to the rigid fastening means of said rods, thus relieving the pivotal joints entirely of all strain. It will thus be seen that while the circle-bar may be readily adjusted in width, all strains brought on the thill-eyes will be taken up by the rigid connections of the brace-rods, the pivotal joints between the circle-bar sections and the arms 3 being entirely relieved of all strains.

By connecting together the forward ends of the brace-rods and adjustably connecting them at their connected ends to the pole 1 an equal adjustment of the thill-eyes is assured, there being no danger of one thill-eye being adjusted nearer to the pole than the other eye, as might be the case were each extension adjusted independently of the other. The advantage of securing an absolutely equal adjustment of these extension-arms will be readily seen. If these arms are not evenly adjusted, the pole will be thrown off the center and the strain will be brought more on one thill-eye than on the other.

Having thus fully described my invention, what I claim, and desire to secure by Letters Patent, is—

1. In an adjustable vehicle-pole the combination of a pole, a circle-bar secured to the rear end of said pole, extension-arms pivoted to the outer ends of said circle-bar, brace-rods rigidly bolted at their rear ends to said extension-arms and connected together at their forward ends, and means for adjustably clamping said braces to the pole at their connected ends, whereby said extension-arms may be simultaneously and uniformly adjusted, and whereby all strain brought on the thill-eyes will be transferred directly to the rigid fastening means of the braces, thereby taking the strain off the pivotal connections between the extension-arms and the ends of the circle-bar.

2. In an adjustable vehicle-pole the combination of a pole, a circle-bar secured to the rear end thereof, said bar being formed of two sections pivoted at their inner ends to the pole, extension-arms pivoted to the outer ends of the circle-bar, thill-eyes pivoted to the rear ends of the extension-bars, and brace-rods rigidly connected to the said extension-arms, and adjustably clamped to the pole, whereby strain put on the thill-eyes will be transferred to the rigid non-pivotal fastening means of the brace-rods, thereby relieving the pivotal connections between the extension-arms and the circle-bar.

3. In an adjustable vehicle-pole the combination of a pole, a two-part circle-bar secured to the rear end of said pole, extension-arms pivoted to the outer ends of said circle-bar, brace-rods rigidly secured at their rear ends to said extension-arms and connected together at their forward ends, and means for adjustably clamping said connected forward ends to the vehicle-pole.

In testimony whereof I hereunto affix my signature, in the presence of two witnesses, this 26th day of March, 1900.

GEORGE A. LAMBERT.

Witnesses:
G. S. KING,
H. E. LONGENECKER.